US006981997B2

(12) United States Patent
Williams et al.

(10) Patent No.: US 6,981,997 B2
(45) Date of Patent: Jan. 3, 2006

(54) DEAERATION OF WATER AND OTHER LIQUIDS

(75) Inventors: William Robert Williams, Teksbury, MA (US); Marcilio Paiva Prado, Barra da Tijuca (BR); Luis Claudio Dias Nogueira, Duque de Caxias (BR)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/621,315

(22) Filed: Jul. 18, 2003

(65) Prior Publication Data

US 2005/0011355 A1   Jan. 20, 2005

(51) Int. Cl.
 *B01D 19/00* (2006.01)
(52) U.S. Cl. ............................. 95/263; 95/265; 96/193; 96/200; 426/475; 426/477
(58) Field of Classification Search .................. 95/246, 95/263, 266, 265; 96/193, 200, 194; 426/475, 426/477
See application file for complete search history.

(56) References Cited

U.S. PATENT DOCUMENTS

| 3,256,802 | A | | 6/1966 | Karr .............................. 99/275 |
|---|---|---|---|---|
| 3,323,783 | A | | 6/1967 | Schwertfeger et al. ......... 261/35 |
| 3,552,726 | A | | 1/1971 | Kraft ............................ 261/50 |
| 3,583,601 | A | | 6/1971 | Ayers ............................. 222/1 |
| 3,780,198 | A | | 12/1973 | Pahl et al. ................... 426/477 |
| 3,877,358 | A | | 4/1975 | Karr .............................. 99/275 |
| 3,960,164 | A | | 6/1976 | Kelley ......................... 137/202 |
| 4,112,828 | A | | 9/1978 | Mojonnier et al. ........... 99/275 |
| 4,187,262 | A | | 2/1980 | Fessler et al. ............. 261/50 B |
| 4,191,784 | A | | 3/1980 | Mojonnier et al. ......... 426/475 |
| 4,259,360 | A | * | 3/1981 | Venetucci et al. .......... 426/231 |
| 4,265,167 | A | | 5/1981 | Mojonnier et al. ........ 99/323.2 |
| 4,265,376 | A | | 5/1981 | Skidell ........................ 222/189 |
| 4,350,503 | A | | 9/1982 | Skoli et al. .................... 55/165 |
| 4,352,679 | A | * | 10/1982 | Notardonato et al. ......... 95/245 |
| 4,352,682 | A | | 10/1982 | Kemp, Jr. et al. ............. 55/165 |
| 4,482,509 | A | | 11/1984 | Iannelli ..................... 261/64 B |
| 4,518,541 | A | | 5/1985 | Harris .......................... 261/27 |
| 4,708,827 | A | | 11/1987 | McMillin ..................... 261/35 |
| 4,743,405 | A | * | 5/1988 | Durao et al. .................. 261/76 |
| 4,766,001 | A | * | 8/1988 | Mizandjian et al. ......... 426/477 |
| 4,882,097 | A | | 11/1989 | Shannon ...................... 261/35 |
| 5,061,406 | A | * | 10/1991 | Cheng .......................... 261/76 |
| 5,112,357 | A | * | 5/1992 | Bjerklund et al. ............. 95/263 |
| 5,211,916 | A | * | 5/1993 | Cheng ........................ 422/107 |
| 5,302,325 | A | * | 4/1994 | Cheng .......................... 261/76 |

(Continued)

FOREIGN PATENT DOCUMENTS

EP           0645168 B1    6/1997

*Primary Examiner*—Duane Smith
*Assistant Examiner*—Douglas J. Theisen
(74) *Attorney, Agent, or Firm*—Donald T. Black

(57) ABSTRACT

Liquid such as water is deaerated by dissolving stripping gas such as carbon dioxide into the water while maintaining pressure, reducing the pressure, and then feeding the liquid into a vessel wherein a gas space is maintained over said water, wherein the pressure of said gas space is less than the pressure upstream, and separately withdrawing degassed liquid and evolved gas from said vessel at rates which maintain the pressure of said gas space below the pressure upstream of said means.

20 Claims, 2 Drawing Sheets

U.S. PATENT DOCUMENTS

| | | | |
|---|---|---|---|
| 5,356,600 A | * 10/1994 | Kiyonaga et al. | 422/234 |
| 5,474,717 A | 12/1995 | Bucher et al. | 261/140.1 |
| 5,792,391 A | 8/1998 | Vogel et al. | 261/121.1 |
| 6,355,292 B1 | 3/2002 | Cheng et al. | 426/477 |

* cited by examiner

DEAERATION OF WATER AND OTHER LIQUIDS

FIELD OF THE INVENTION

The present invention relates to the removal of dissolved or absorbed gas, such as oxygen or air, from water or other liquids.

BACKGROUND OF THE INVENTION

In many processes that employ water, it is desirable that the content of dissolved air or oxygen in the water be lower than the content found in the water as it comes in from a municipal feed line, or as it is recovered in a recycle stream from another processing stage. This is especially the case in processes that employ water in the manufacture of beverages. The dissolved air or oxygen contributes to undesired foaming, undesirable degradation of flavor, and interference with the dissolution of carbon dioxide into the water during the manufacture of carbonated beverages.

The removal of dissolved oxygen is also important in many other industrial processes, such as preparation of syrups and edible oils.

The removal of dissolved gas such as air or oxygen from the water or other liquid is referred to herein as "deaeration".

Deaeration in the soft drink and brewing industries typically uses carbon dioxide ($CO_2$) as a stripping gas. This has the advantage that any carbon dioxide that absorbs into the water is simply incorporated into the carbonated product. In order to accomplish the desired stripping, the deaerator needs to be run at low pressure (vacuum or atmosphere). At these conditions, equilibrium favors gas removal, but achieving desired gas absorption under these conditions is difficult. This usually means that little carbon dioxide is absorbed into the water, so carbon dioxide losses are high, typically 1 volume of gas (STP) per volume of water.

Current deaeration systems use large amounts of gas, heat, vacuum, or a combination thereof to remove air from the water. Typically, current units simply waste high amounts of carbon dioxide to accomplish the deaeration, or use vacuum pumps and run the deaerator at low pressure. The former is expensive in terms of raw materials (such as carbon dioxide), and the latter is expensive in terms of energy, maintenance, and equipment.

Thus, there remains a need for a method of achieving deaeration of water, which is more effective than current methods and is more efficient in terms of the deaeration achieved per resources (such as carbon dioxide and equipment volumes) expended.

BRIEF SUMMARY OF THE INVENTION

These and other objects are achieved by a method for removing a gaseous component from a liquid, which comprises the steps of
 (a) providing a liquid which contains the gaseous component,
 (b) dissolving stripping gas that is more soluble in said liquid than said gaseous component is, into said liquid while maintaining pressure on said liquid that is greater than the vapor pressure of said amount of said gaseous component therein at the prevailing temperature,
 (c) passing said liquid through a means which reduces the pressure thereon, and then
 (d) feeding said liquid into a vessel wherein a gas space is maintained over said liquid, wherein the pressure of said gas space is less than the pressure upstream of said means, whereby said gaseous component evolves from said liquid in said vessel, and separately withdrawing said evolved gaseous component, and said liquid from which said gaseous component has evolved, from said vessel at rates which maintain the pressure of said gas space below the pressure upstream of said means.

As used herein, gas is considered to be "contained" in a liquid if the gas is present in the liquid without being discernible to the naked eye, regardless of the precise chemical or physical mechanism by which atoms or molecules of the gas are retained in the liquid. Bubbles of gas that are visible in the liquid do not constitute "contained" gas but liquid can contain gas in accordance with this definition even if such bubbles are also visible in the liquid.

As used herein, "gaseous component" means a single chemical entity or a mixture of two or more chemical entities, which is or are gaseous at 25° C. and atmospheric pressure when not dissolved in a liquid.

DETAILED DESCRIPTION OF THE INVENTION

The present invention is applicable to treatment of liquids including aqueous liquids, by which is meant water and water-containing compositions including solutions (of solid or liquid solutes), emulsions, dispersions and suspensions, and nonaqueous liquids, by which is meant hydrophilic and hydrophobic liquids not containing water, including solutions (of solid or liquid solutes), emulsions, dispersions and suspensions.

Examples of liquids that can be treated by this invention include water for beverage manufacture (which is considered a preferred embodiment of the invention); edible oils examples of which include edible food oils (e.g. vegetable oils) whether naturally occurring or subsequently treated; syrups for food manufacture; and organic liquids.

The gaseous component to be removed from the liquid is often air or one or more constituents of air, such as oxygen. The invention is described herein with reference to oxygen as the preferred embodiment of the gaseous component to be removed from the liquid, but it should be understood that removal of oxygen as described herein will be expected to succeed in removing other unwanted gaseous components as well from the liquid.

Figure 1:
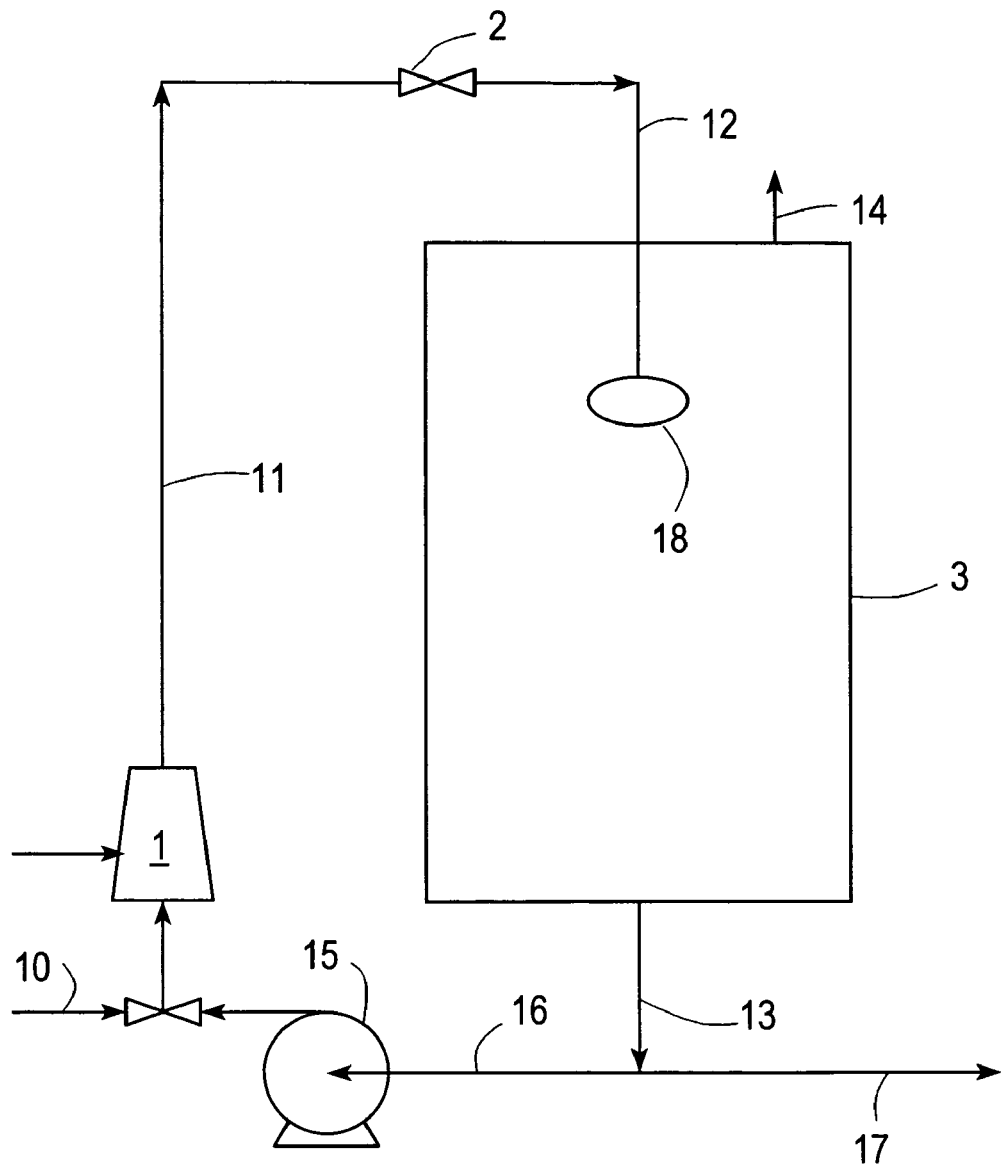
FIG. 1 is a flowsheet of one embodiment of the present invention.

Referring to FIG. 1, there is shown an embodiment including recycle of the liquid. This embodiment will be described as it would be used for treating water useful in beverage manufacture, which is considered to be the best mode of the invention. Stream 10 of incoming feed water is combined with stream 16 of recycled water, and the combined streams are passed through injector 1 which feeds (injects) a stripping gas into the water.

The stripping gas should be more soluble in the liquid than is the gaseous component to be removed. Carbon dioxide is the preferred stripping gas for many applications, such as treatment of water for beverage manufacture. Other gases useful as stripping gas include nitrogen and argon.

The amount of stripping gas to inject will depend on the temperature and pressure conditions in the separation tank 3, and on the identities of the stripping gas and the liquid being treated. For example, for deaeration using carbon dioxide where the tank 3 is maintained at ambient temperature and pressure, the amount of carbon dioxide injected should be about 1 to 3 v/v (vol. $CO_2$/vol. water). Preferably, the water is passed through a device such as a gas injector where the carbon dioxide (or other stripping gas) is added. These devices are capable of creating fine gas bubbles for excellent gas-liquid interfacial mass transfer. The two-phase mixture exiting from this gas addition stage is still under line pressure. This allows very rapid dissolution of the gas into the liquid.

Other types of gas dissolution devices can be used as an injector (such as the device disclosed in U.S. Pat. No. 4,743,405). Other inline gas dissolution devices such as supersonic mixers developed by Praxair, Inc. (e.g. U.S. Pat. No. 5,061,406) can be used. Useful techniques may also be found in U.S. Pat. Nos. 5,211,916, 5,302,325 and 5,356,600. These inline gas dissolution devices are preferably chosen for this application because of their ability to create superfine bubbles of gas which are able to dissolve over a short residence time.

The pressure head inside the line allows the stripping gas to be completely dissolved into the liquid without forming or retaining residual gas bubbles. This is important because a two-phase flow with unequilibrated gas still present as bubbles will interfere with the desired deaeration downstream. Countercurrent gas dissolution devices can be employed but are not preferred.

Pressure is maintained on the liquid containing the stripping gas after the stripping gas is fed into the liquid. The pressure should be greater than the vapor pressure (equilibrium pressure), at the prevailing temperature, of the amount of gaseous component that is contained in the liquid. Some of the gas to be removed will likely evolve from the liquid, because with the introduction of the other gas, thermodynamics dictates that the other gas will evolve. Preferably, this pressure is as close as possible to the pressure on the liquid before the gas is injected.

Streams 10, 16 and 11 are under high pressure, more than one atmosphere and preferably on the order of 35 to 90 psig for room temperature processing. In general, the pressure must remain greater than the equilibrium pressure required to be sure that the injected stripping gas remains dissolved. Pressure is provided by the line pressure of stream 10 and by pump 15.

Conditions are provided in line 11 such that the stripping gas dissolves into the liquid on the high pressure side of point 2. As discussed further below, 2 denotes a means such as a pressure control valve through which the stream passes whereupon the pressure on the stream is reduced. Dissolution can be achieved by providing sufficient contact time (e.g. providing a sufficient length of line 11 taking into account the flow rate), and by chilling the water to as low as e.g. 5–10° C. to increase the solubility of the stripping gas in the liquid. If carbon dioxide is used as the stripping gas, the dissolved carbon dioxide content in the water should be at least 1.0 v/v and preferably at least 3 v/v. It is preferred that maximum possible dissolution of the stripping gas be achieved, although of course any degree of dissolution is desirable.

Passing the stream through means 2 reduces the pressure on the stream, preferably to the pressure in the deaerator tank 3, which is usually 0–50 psig. While the liquid is in line 12 downstream of means 2, gas should still not be permitted to evolve from the liquid.

Line 12 feeds the liquid into vessel 3 which is where deaeration occurs. The liquid can be fed through a spray head 18 within vessel 3, as shown, or can simply be fed out the open end of line 12 within vessel 3.

The vessel 3 can be any conventional tank that is closed except for the feed and exit lines described herein. It is large enough to hold the liquid and to have a gas space above the liquid. The pressure of the gas space above the liquid in vessel 3 is lower than the pressure on the liquid upstream from means 2. Typically, the gas space pressure within vessel 3 is 0 to 50 psig.

As an example, in a carbon dioxide based process, dissolved carbon dioxide elutes from the liquid throughout the vessel forming fine, well-dispersed bubbles in the liquid phase and continuous contact with the sprayed liquid in the headspace. Significantly, and surprisingly, dissolved gas evolves from the liquid in amounts that are large in their own right and are quite large relative to the surprisingly small amount of stripping gas that evolves and relative to the amount of stripping gas introduced at feed point 1.

The deaerated liquid leaves vessel 3 as stream 13, and evolved gas is removed via vent 14. The flow rates of streams 13 and 14 are adjusted such that the pressure of the gas space within vessel 3 remains sufficiently low, below the pressure upstream of means 2, that the liquid entering vessel 3 continues to be deaerated as described herein.

In the embodiment shown in FIG. 1, a portion of stream 13 is split off as recycle stream 16 which returns through pump 15 to join incoming liquid stream 10. The remaining portion leaves the system as stream 17. In the embodiment shown in FIG. 2, there is no recycle; all of stream 13 leaves the system. Pressure in the line upstream of means 2 is provided by pump 15 which is in line 10.

If the deaerated liquid is water, the stream that is produced can be used to make up beverages, especially carbonated beverages.

It has been found that placing the stripping gas injection device in stream 10 which is at higher pressure, combined with the other conditions described herein, provides effective and efficient deaeration even though one would expect this to be disadvantageous because one would expect higher pressures to favor gas dissolution, and not gas removal (deaeration).

Surprisingly, little stripping gas exits during the deaeration in vessel 3, even though the liquid entering vessel 3 is supersaturated in stripping gas (that is, the liquid contains more stripping gas than what the equilibrium amount would be at the same temperature and at atmospheric pressure). As a result, little stripping gas is lost in order to achieve the deaeration required.

The process of the invention provides very effective deaeration compared to other possible modes of using carbon dioxide or other stripping gas to achieve deaeration. One unexpected advantage of this method is that because the stripping gas is dissolved in the liquid, it elutes from the liquid throughout the deaeration vessel, whereas when the stripping gas is simply mixed with the liquid and contacted, any stripping gas simply escapes from the top of the deaerator.

Also, when one uses low pressure injection of gas, although deaeration may occur in the vessel, any undissolved stripping gas simply escapes the deaerator without contacting the sprayed or distributed liquid. Thus the stripping gas is wasted.

Further, in deaerator systems where stripping gas is simply sparged into the bottom of the deaerator, the sparging cannot create finely dispersed and evenly distributed bubbles. With injection of stripping gas into the high pressure stream of liquid being treated, in accordance with the present invention, the liquid in the liquid reservoir at the bottom of the deaerator is a supersaturated solution of the stripping gas. As the stripping gas nucleates and elutes from solution, it naturally forms well-dispersed small bubbles. The stripping gas remains longer in the liquid, and deaeration is enhanced, even though it at first would appear that subsurface sparging would provide the maximum contact area.

The invention is further described in the following examples, which are provided for purposes of illustration and not limitation.

EXAMPLE 1

Figure 2:
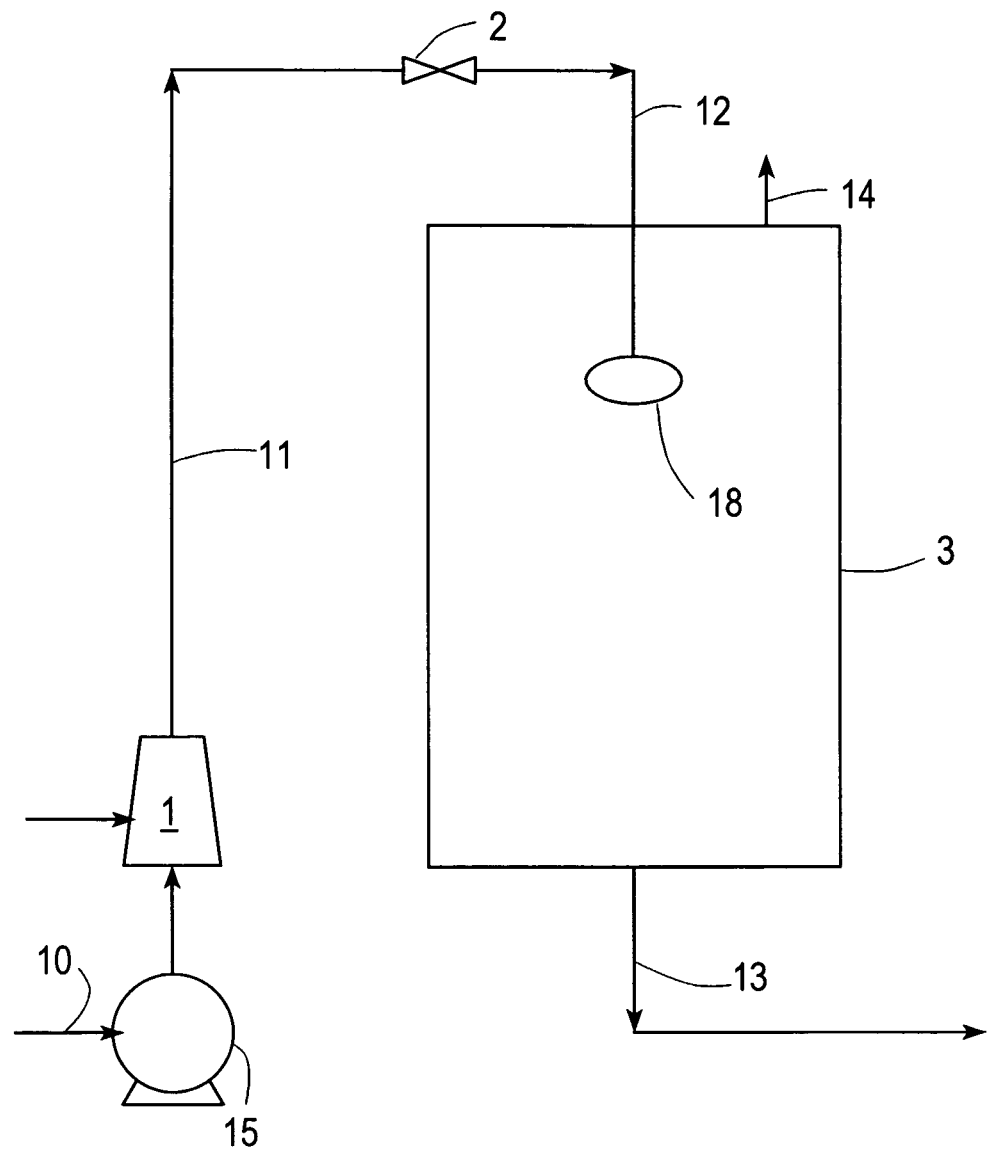
FIG. 2 is a flowsheet of another embodiment of the present invention.

This example demonstrates dissolving $CO_2$ into the water and then liberating some of the $CO_2$ to strip oxygen, in the embodiment depicted in FIG. 2. Table 1 contains the results.

TABLE 1

Results of lab tests, showing $CO_2$ dissolution at supersonic injector under high pressure and $CO_2$ liberation in the break-tank at low pressure with stripping of oxygen.

|  | Run No. | | |
| --- | --- | --- | --- |
|  | 1 | 2 | 3 |
| Water flow rate (L/hr) | 2100 | 2100 | 2100 |
| Gas flow rate (L/min) | 40.70 | 54.86 | 54.10 |
| Pressure (kg/cm$^2$)at: | | | |
| outlet of pump 15 | 4.2 | 4 | 4 |
| line 11 | 3.2 | 2.8 | 2.8 |
| line 12 | 2.8 | 2.8 | 3 |
| line 13 | 4 | 4 | 3.8 |
| Oxygen content (ppm) at: | | | |
| outlet of pump 15 | 8.13 | 7.55 | 5.6 |
| line 11 | 6.32 | 4.91 | 2.8 |
| line 12 | 7.82 | 6.16 | 3 |
| line 13 | 1.9 | 0.95 | 0.52 |
| Carbon dioxide content (v/v) at: | | | |
| outlet of pump 15 | 0 | 0 | 0 |
| line 11 | 0.972 | 1.34 | 1.3 |
| line 12 | 0.978 | 1.71 | 1.5 |
| line 13 | 0.68 | 0.76 | 0.33 |
| Temperature (C.) at: | | | |
| line 11 | 26 | 25 | 30 |
| vessel 3 (liquid) | 26 | 24 | 32 |

As can be seen from Table 1, $CO_2$ was dissolved under high pressure and then re-liberated in the break-tank, and deaeration expressed as reduction of oxygen content was achieved.

EXAMPLE 2

Tests at a bottler showed that $CO_2$ was retained in the vessel 3 (break tank) much better than expected. One might expect that air would not elute if the $CO_2$ did not leave, but excellent deaeration was still obtained.

The system was of the type depicted in
FIG. 2, with the addition of a plate type chiller system between the injector 1 and the valve 2.

$CO_2$ was injected into water at 30° C., at 30 psig of pressure. About 20 meters of 4" tubing was provided before the chiller which reduced the water temperature to 7° C. After the chiller, the water then flowed another 15 meters to an open atmosphere tank. No spray device was used; the water simply flowed out of an open pipe. The deaerated water then flowed out of the bottom of the tank to a carbonator. The flow rate of the water was 6 Nm$^3$/hr.

At the temperature and pressure of the line after the chiller, the saturation level of $CO_2$ was estimated to be 2.05 volumes of $CO_2$ (standard temperature and pressure) per volume of water (v/v). In the tank, this value was estimated to be 1.33 v/v $CO_2$. Table 2 contains the results.

TABLE 2

Deaeration results at bottler.

| $CO_2$ fed/Water flow, v/v | Beverage production flow, Nm$^3$/hr | Water flow, Nm$^3$/hr* | $CO_2$ flow, Nm$^3$/hr | Measured v/v $CO_2$ in deaerated water | Measured ppm $O_2$ in deaerated water |
| --- | --- | --- | --- | --- | --- |
| — | 7.2 | 6 | 0 | 0 | 8 |
| 1.80 | 8 | 6.67 | 12.0 | 1.67 | 2.6 |
| 2.00 | 7.2 | 6 | 12.0 | 1.66 | 0.8 |
| 2.25 | 7.2 | 6 | 13.5 | 1.77 | 0.5 |
| 3.00 | 7.2 | 6 | 18.0 | 1.95 | 0.2 |

*Water flow is estimated to account for approximately 20% syrup addition after the deaeration step. Therefore, water flow is approximately ⅚ of the completed beverage production flow.

To measure performance, dissolved oxygen was measured as an indicator of dissolved air. The feed water to the process contained 8 ppm of oxygen. Because no intermediate sampling points were available, data is not available of the water before the break tank. However, even with extremely low $CO_2$ losses (93% $CO_2$ dissolved at 1.8 v/v $CO_2$ fed), deaeration was quite effective, to 3 ppm. Typically, deaerators require 0.8–1 v/v $CO_2$ to be lost in order to deaerate to about 1 ppm, but with the present invention, the water was deaerated to 0.8 ppm $O_2$ with only 0.3 v/v $CO_2$ lost. Thus this invention retains the $CO_2$ much better, but without compromising the efficiency of the deaerator. A much smaller volume of $CO_2$ loss is required to do the same amount of stripping.

What is claimed is:

1. A method for removing a gaseous component from a liquid, which comprises the steps of
   (a) providing a liquid which contains the gaseous component,
   (b) dissolving stripping gas that is more soluble in said liquid than said gaseous component is, into said liquid while maintaining pressure on said liquid that is greater than the vapor pressure of said amount of said gaseous component therein at the prevailing temperature,
   (c) passing said liquid through a means which reduces the pressure thereon, and then
   (d) feeding said liquid into a vessel wherein a gas space is maintained over said liquid, wherein the pressure of said gas space is less than the pressure upstream of said means, whereby said gaseous component evolves from said liquid in said vessel, and separately withdrawing said evolved gaseous component, and said liquid from which said gaseous component has evolved, from said vessel at rates which maintain the pressure of said gas space below the pressure upstream of said means.

2. The method of claim 1 wherein the gaseous component is oxygen.

3. The method of claim 2 wherein the stripping gas is carbon dioxide.

4. The method of claim 2 wherein the stripping gas is nitrogen.

5. The method of claim 2 wherein the stripping gas is argon.

6. The method of claim 1 wherein the gaseous component is air.

7. The method of claim 6 wherein the stripping gas is carbon dioxide.

8. The method of claim 6 wherein the stripping gas is nitrogen.

9. The method of claim 6 wherein the stripping gas is argon.

10. The method of claim 1 wherein the stripping gas is carbon dioxide.

11. The method of claim 1 wherein the liquid is water.

12. The method of claim 11 wherein the gaseous component is oxygen.

13. The method of claim 11 wherein the stripping gas is carbon dioxide.

14. The method of claim 11 wherein the stripping gas is nitrogen.

15. The method of claim 11 wherein the stripping gas is argon.

16. The method of claim 11 wherein the gaseous component is air.

17. The method of claim 16 wherein the stripping gas is carbon dioxide.

18. The method of claim 16 wherein the stripping gas is nitrogen.

19. The method of claim 16 wherein the stripping gas is argon.

20. The method of claim 1 wherein the liquid is an edible oil.

* * * * *